United States Patent [19]

Brown

[11] Patent Number: 5,291,968

[45] Date of Patent: Mar. 8, 1994

[54] APPARATUS AND METHOD FOR CHANGING AUTOMATIC TRANSMISSION FLUID IN MOTOR VEHICLES

[75] Inventor: Paul V. Brown, Loveland, Colo.

[73] Assignee: Pro Transmission, Inc., Loveland, Colo.

[21] Appl. No.: 63,142

[22] Filed: May 17, 1993

[51] Int. Cl.⁵ .............................................. F16C 3/14
[52] U.S. Cl. ...................................... 184/1.5; 141/98; 141/198; 184/106
[58] Field of Search ................ 184/1.5, 106; 141/95, 141/98, 192, 198

[56] References Cited

U.S. PATENT DOCUMENTS

| | | | |
|---|---|---|---|
| 3,513,941 | 5/1970 | Becnel | 184/1.5 |
| 5,154,775 | 10/1992 | Bedi | 184/1.5 |
| 5,199,317 | 4/1993 | Moore et al. | 184/1.5 |

FOREIGN PATENT DOCUMENTS 0072299 3/1990 Japan ................................. 184/1.5

*Primary Examiner*—Thomas E. Denion
*Attorney, Agent, or Firm*—William E. Hein

[57] ABSTRACT

An automatic transmission fluid change apparatus includes a drain pan and associated holding tank for collecting and retaining used fluid recovered from an automatic transmission. A new fluid reservoir is provided within the apparatus to contain the quantity of new fluid required for a complete change of fluid in the transmission. To accomplish a complete change of fluid in the automatic transmission, the transmission pan and filter are removed and new fluid is pumped from the new fluid reservoir to the transmission orifice to which the outlet tube of the filter is typically coupled. The vehicle engine is simultaneously run at idle speed to circulate the new fluid throughout the transmission, thereby forcing all used fluid out of the transmission for collection and storage in the holding tank.

2 Claims, 1 Drawing Sheet

APPARATUS AND METHOD FOR CHANGING AUTOMATIC TRANSMISSION FLUID IN MOTOR VEHICLES

BACKGROUND AND SUMMARY OF THE INVENTION

This invention relates generally to automatic transmissions of motor vehicles and more particularly to the required periodic maintenance of such automatic transmissions that typically involves cleaning or changing the filter and changing the automatic transmission fluid. The fluid in automatic transmissions not only serves to lubricate the transmission, but to also transfer power from the engine through the torque converter. The ability of the automatic transmission fluid to transfer power, as well as its ability to lubricate, diminishes as the fluid becomes worn due to extended use. Regular maintenance servicing of automatic transmissions is therefore very important.

In older motor vehicles, a drain plug was provided on the torque converter that permitted draining of most of the automatic transmission fluid during maintenance service. In newer motor vehicles, the drain plug previously provided on the torque converter has been eliminated. Thus, recommended maintenance service of the automatic transmissions of these late model vehicles involves removing the pan from the underside of the transmission, discarding the used fluid that is gravitationally contained within the pan (approximately 3 quarts), cleaning or changing the transmission filter or screen, replacing the pan, and adding three quarts of automatic transmission fluid through the dipstick filler tube to replenish the used fluid drained when the pan was removed. This well known method for servicing automatic transmissions results in replacing only three quarts of the total automatic transmission fluid capacity of approximately twelve quarts. Thus, nine quarts of used transmission fluid remain in the automatic transmission. The only previously known way to completely replace the fluid in automatic transmissions has been to remove the transmission from the vehicle and dismantle it, a procedure that is far to costly to be considered as a routine maintenance alternative.

It is therefore the principal object of the present invention to provide a cost effective method and apparatus for completely replacing the fluid in automatic transmissions of motor vehicles at maintenance service intervals. This and other incidental objects are accomplished in accordance with the illustrated preferred embodiment of the present invention by providing an automatic transmission fluid change apparatus having a drain pan and associated holding tank for collecting and retaining used fluid recovered from an automatic transmission. A new fluid reservoir is provided within the apparatus to contain the quantity of new fluid required for a complete change of fluid in the transmission. To accomplish a change of fluid, the transmission pan and filter are removed and new fluid is pumped from the new fluid reservoir to the transmission orifice to which the outlet tube of the filter is typically coupled. The vehicle engine is then run at idle speed to circulate the new fluid throughout the transmission, thereby forcing all used fluid out of the transmission for collection and storage within the apparatus.

DETAILED DESCRIPTION OF THE PREFERRED EMBODIMENT

Figure 1:
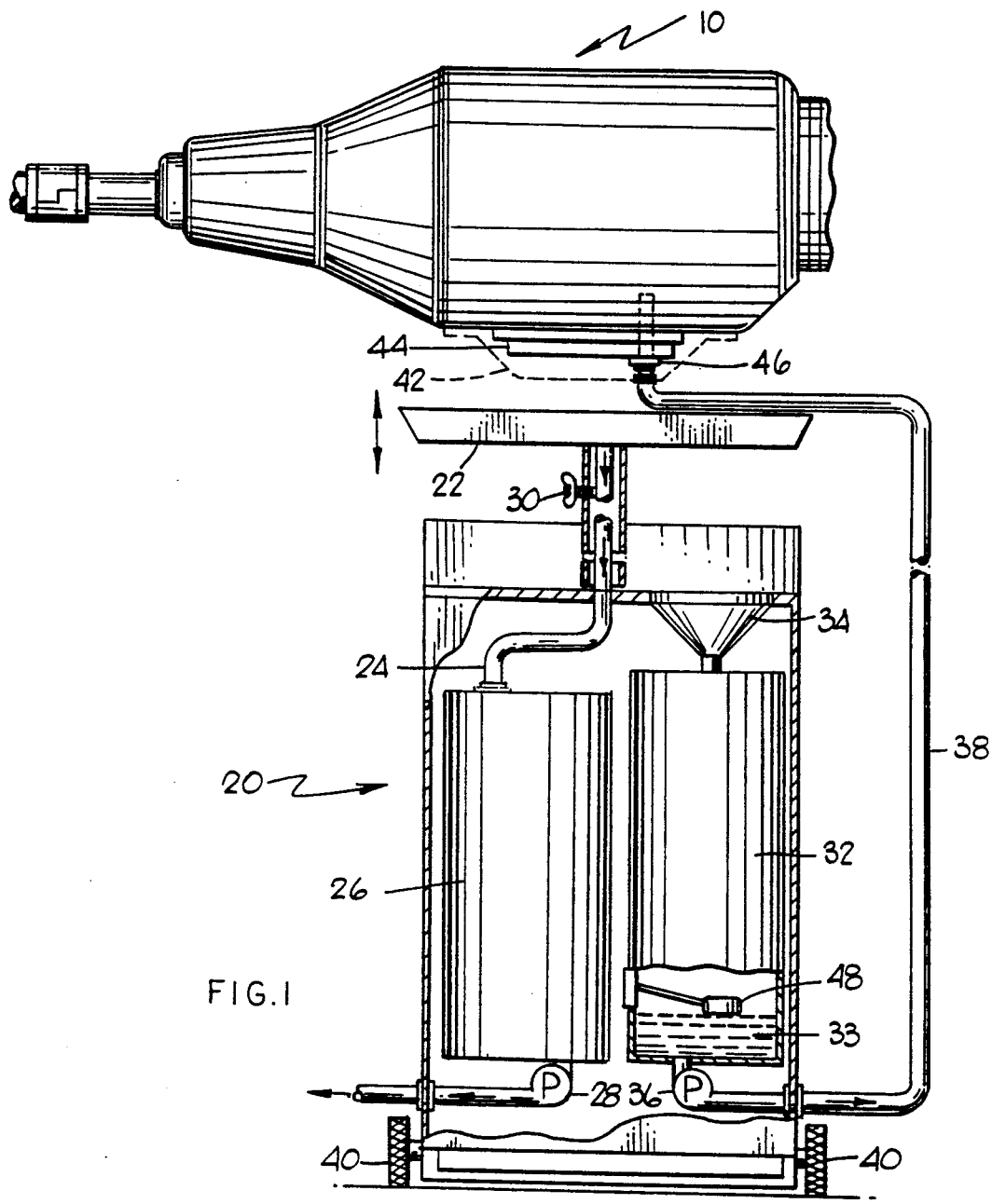
FIG. 1 is a partially cut away pictorial diagram illustrating the automatic transmission fluid change apparatus of the present invention and the way in which it is coupled to an automatic transmission during routine maintenance service.

Referring now to FIG. 1, there is shown a typical automatic transmission 10 on which it is desired to perform routine maintenance service. Automatic transmission 10 is, of course, contained within a motor vehicle, not illustrated, that is typically lifted by means of a conventional service bay hydraulic lift to a desired height above the floor of the service bay to enable a mechanic to access the underside of automatic transmission 10. The automatic transmission fluid change apparatus 20 of the present invention is constructed as a movable console that includes a drain pan 22 for collecting the used fluid recovered from automatic transmission 10. Drain pan 22 is coupled by means of a hose 24 to a holding tank 26 within automatic transmission fluid change apparatus 20. A conventional pump 28 is employed to pump the used fluid contained within holding tank 26 to an external disposal tank. The height of drain pan 22 may be adjusted by means of a thumb screw 30 or other conventional mechanism. Drain pan 22 may thereby be raised in preparation for maintenance service on automatic transmission 10 and may thereafter be lowered to permit easy removal of automatic transmission fluid change apparatus 20 from beneath the elevated motor vehicle. A reservoir 32 within automatic transmission fluid change apparatus 20 is employed to contain a supply of new transmission fluid 33, which may be poured into reservoir 32 through a funnel opening 34 at the top thereof. A conventional pump 36 is employed to pump new transmission fluid from reservoir 32 to automatic transmission 10 via a flexible hose 38. A pair of wheels 40 is provided on automatic transmission fluid change apparatus 20 to facilitate positioning thereof beneath an elevated motor vehicle.

In operation, a vehicle having an automatic transmission 10 on which it is desired to perform maintenance service is lifted on a conventional service bay lift to a height that permits wheeling automatic transmission fluid change apparatus 20 into place beneath automatic transmission 10. Drain pan 22 is raised into position for collecting used transmission fluid from automatic transmission 10. A transmission pan 42 is removed from the underside of automatic transmission 10, thereby allowing approximately three quarts of fluid retained by transmission pan 42 to be released into drain pan 22. Removal of transmission pan 42 also exposes a conventional transmission fluid filter or screen 44 for changing or cleaning. Hose 38 is then connected to an orifice 46 of transmission 10 at which an outlet tube of filter 44 is typically coupled. Operation of pump 36 is initiated to pump new transmission fluid from reservoir 32 to transmission 10. At the same time, the engine of the vehicle is started and is run at a fast idle to thereby force new transmission fluid provided from reservoir 32 through transmission 10. In the process of forcing new transmission fluid through transmission 10, the remaining used transmission fluid that would ordinarily remain in the valve body, torque converter, cooling lines, and heat exchanger of transmission 10 is in turn forced out into drain pan 22. When the amount of new fluid equal to the fluid capacity of transmission 10 has been pumped from reservoir 32, the automatic transmission fluid change apparatus 20 provides an indication to the operator, who then turns off the vehicle engine. A float mechanism 48 may be provided within reservoir 32 to determine when a a desired quantity of new fluid has been pumped therefrom. Hose 38 is then removed from transmission 10 and filter 44 and transmission pan 42 are replaced.

Figure 2:
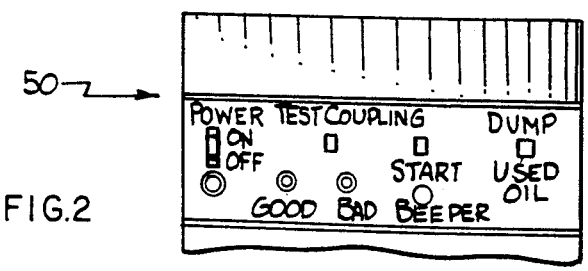
FIG. 2 is an illustration of the front panel controls and indicators of the automatic transmission fluid change apparatus of FIG. 1.

A control panel 50 that may be provided on automatic transmission fluid change apparatus 20 is illustrated in FIG. 2. A number of controls and indicators may be provided on control panel 50 for the purpose of applying power (POWER ON/OFF switch), initiating operation of pump 36 (TEST COUPLING switch), and indicating that a desired quantity of new fluid has been pumped from reservoir 32 into transmission 10 (GOOD indicator), for example. In the event pump 36 continues running, thus indicating a leak, a BAD indicator is lit. An audible indicator (BEEPER) will sound when nearly all of the desired quantity of new fluid in reservoir 32 has been pumped into transmission 10, thereby signaling the operator to turn off the vehicle engine. Operation of pump 28 for pumping used fluid contained within holding tank 26 may be initiated by actuation of the DUMP USED OIL switch.

As may be understood from the foregoing detailed description, the apparatus and method of the present invention facilitates a complete replacement of the used fluid in automatic transmission 10 with new fluid from reservoir 32, rather than only a partial replacement, as is obtained using conventional transmission fluid service methods.

I claim:

1. An apparatus for facilitating the fluid complete change of the fluid contained within an automatic transmission of a motor vehicle, the apparatus comprising:

drain pan means positioned for receiving used fluid drained from said automatic transmission;

a used fluid reservoir, coupled to said drain pan means, for retaining used fluid received by said drain pan means;

a new fluid reservoir for retaining a quantity of new fluid for replacement of the used fluid drained from said automatic transmission;

pump means, coupled to said fluid reservoir, for pumping a desired quantity of new fluid from said new fluid reservoir to said automatic transmission;

hose means, connecting an outlet of said pump mans to a filter outlet tube orifice of said automatic transmission; and a control panel, including pump control means for enabling an operator to initiate operation of said pump means and for thereafter automatically halting operation of said pump means when said desired quantity of new fluid has been pumped from said new fluid reservoir.

2. A method for completely changing fluid contained within an automatic transmission of a motor vehicle, the method comprising:

providing a drain pan and a used fluid reservoir coupled together for receiving and containing used fluid drained from said automatic transmission, said drain pan being positioned beneath said automatic transmission;

removing a transmission pan from an underside of said automatic transmission to permit used fluid to drain by gravity from said automatic transmission;

providing a new fluid reservoir containing a quantity of new fluid to be supplied to said automatic transmission;

coupling said new fluid reservoir to a filter outlet tube orifice of said automatic transmission;

pumping a desired quantity of new fluid from said new fluid reservoir to said filter outlet tube orifice of said automatic transmission; and simultaneously running an engine of said motor vehicle for a period of time to thereby force said desired quantity of new fluid pumped from said new fluid reservoir through said automatic transmission and to also thereby force all of said used fluid from said automatic transmission into said said drain pan.

* * * * *